US008924673B2

(12) United States Patent
Bish et al.

(10) Patent No.: US 8,924,673 B2
(45) Date of Patent: *Dec. 30, 2014

(54) DYNAMIC REUSE AND RECONFIGURATION OF LOGICAL DATA OBJECTS IN A VIRTUAL TAPE SYSTEM

(75) Inventors: Thomas W. Bish, Tucson, AZ (US); Erika M. Dawson, Tucson, AZ (US); Jonathan W. Peake, Tucson, AZ (US); Joseph M. Swingler, Tucson, AZ (US); Michael W. Wood, Warwick (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/483,667

(22) Filed: May 30, 2012

(65) Prior Publication Data

US 2012/0239891 A1 Sep. 20, 2012

Related U.S. Application Data

(63) Continuation of application No. 12/635,627, filed on Dec. 10, 2009.

(51) Int. Cl.
| | |
|---|---|
| *G06F 12/12* | (2006.01) |
| *G06F 12/14* | (2006.01) |
| *G06F 9/50* | (2006.01) |
| *G06F 3/06* | (2006.01) |

(52) U.S. Cl.
CPC ............ *G06F 9/5027* (2013.01); *G06F 3/0605* (2013.01); *G06F 3/0686* (2013.01); *G06F 3/0631* (2013.01)
USPC ........... 711/163; 711/156; 711/166; 711/159; 711/E12.102

(58) Field of Classification Search
None
See application file for complete search history.

(56) References Cited

U.S. PATENT DOCUMENTS

| | | | |
|---|---|---|---|
| 6,339,810 B1 | 1/2002 | Basham et al. | |
| 6,982,846 B2 | 1/2006 | Jaquette | |

(Continued)

FOREIGN PATENT DOCUMENTS

| | | |
|---|---|---|
| CN | 102713851 A | 10/2012 |
| DE | 11 2010 004 076 T5 | 10/2012 |
| GB | 2488072 A | 8/2012 |

OTHER PUBLICATIONS

IBM, "IBM Virtualization Engine TS7700 Series Introduction and Planning Guide," Nov. 24, 2009, IBM Coporation, pp. 1-217.*

(Continued)

*Primary Examiner* — Michael Krofcheck
(74) *Attorney, Agent, or Firm* — Zilka-Kotab, PC

(57) ABSTRACT

A method in one embodiment for operating a virtual server supporting at least one Write Once Read Many (WORM) logical data object and at least one read-write logical object includes initializing a logical data object from a common pool of the logical data objects, the logical data object bound with a member of a media type group, the member of the media type group comprising a WORM logical data object and a read-write logical data object; and reusing one of the logical data objects as the member of the media type group without ejection and reinsertion by mounting the logical data object with a write from beginning of logical data object to bind at least one data attribute to the member of the media type group to replace any previous attribute and data associated with the logical data object.

26 Claims, 6 Drawing Sheets

(56) References Cited

U.S. PATENT DOCUMENTS

| | | |
|---|---|---|
| 7,193,803 B2 | 3/2007 | Jaquette |
| 7,558,839 B1 | 7/2009 | McGovern |
| 2005/0235095 A1 | 10/2005 | Winarski et al. |
| 2006/0031651 A1 | 2/2006 | Nonaka et al. |
| 2007/0022259 A1* | 1/2007 | Kitamura et al. ............ 711/152 |
| 2007/0043773 A1* | 2/2007 | Tsuji ............................ 707/200 |
| 2007/0094469 A1 | 4/2007 | Haustein et al. |
| 2007/0250547 A1* | 10/2007 | Kai et al. ..................... 707/202 |
| 2008/0250197 A1 | 10/2008 | Daily et al. |
| 2011/0107024 A1* | 5/2011 | Bish et al. ................... 711/111 |
| 2011/0145517 A1 | 6/2011 | Bish et al. |

OTHER PUBLICATIONS

Written Opinion and Search Report from PCT Application No. PCT/EP2010/067287 dated Apr. 29, 2011.

IBM, IBM Virtualization Engine TS7700 Family, IBM Corporation 2010, IBM Systems and Technology Group Data Sheet, pp. 1-6.

IBM, "IBM Virtualization Engine TS7700 Series Introduction and Planning Guide," IBM Corporation 2005, 2010, pp. 1-222.

Non-Final Office Action from U.S. Appl. No. 12/635,627 dated Sep. 26, 2012.

Final Office Action from U.S. Appl. No. 12/635,627 dated Mar. 21, 2013.

* cited by examiner

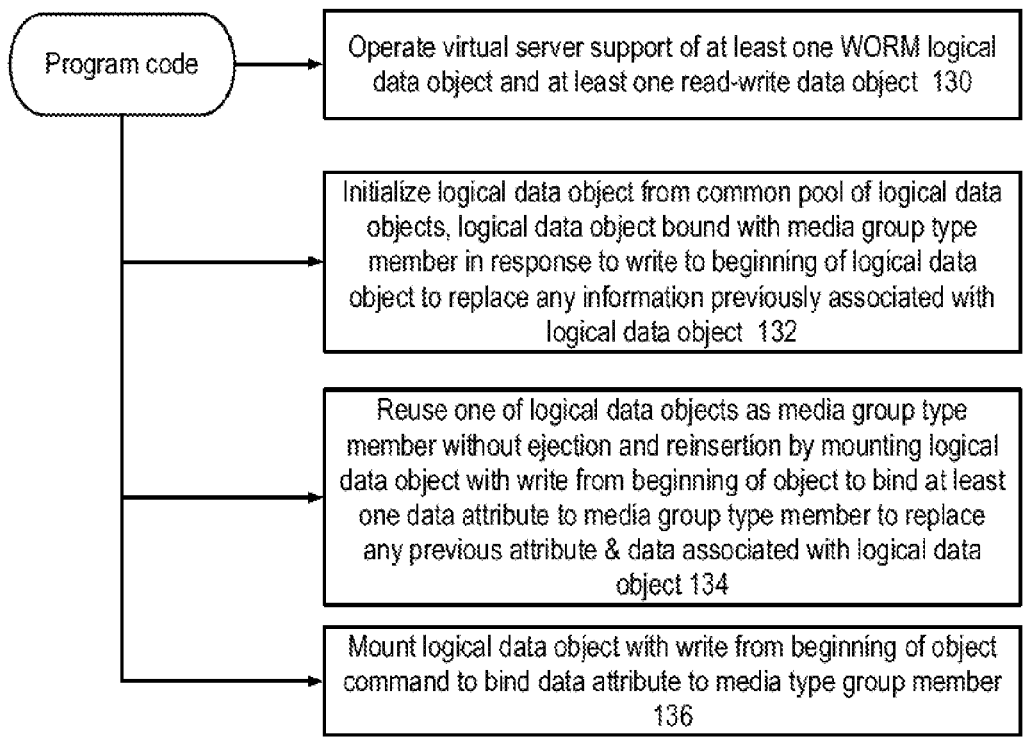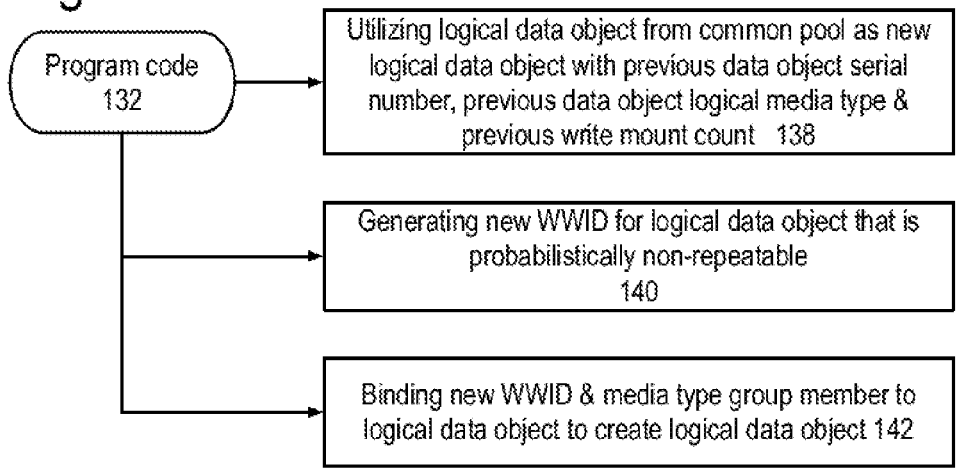

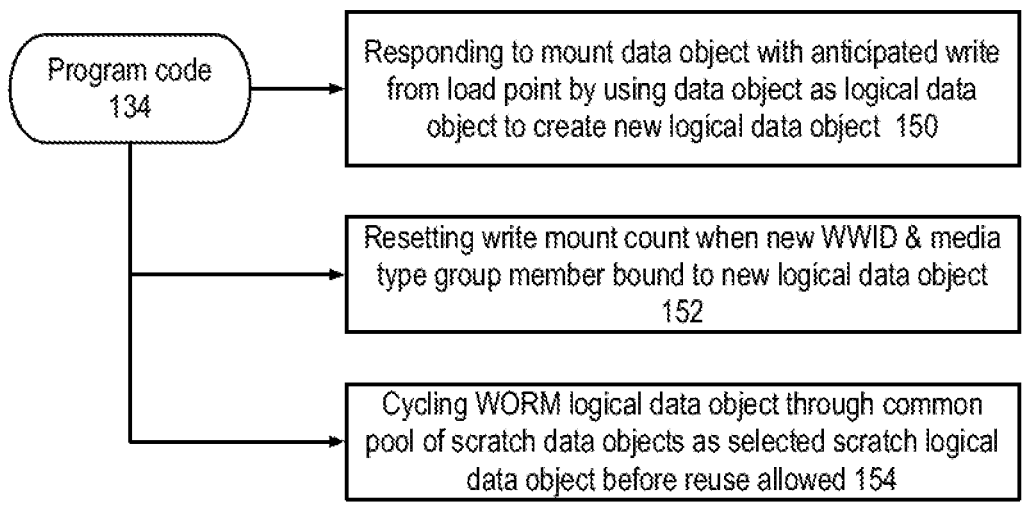

DYNAMIC REUSE AND RECONFIGURATION OF LOGICAL DATA OBJECTS IN A VIRTUAL TAPE SYSTEM

RELATED APPLICATION

This application is a continuation of copending U.S. patent application Ser. No. 12/635,627, filed Dec. 10, 2009, which is incorporated herein by reference.

DOCUMENTS INCORPORATED BY REFERENCE

Commonly assigned U.S. Pat. Nos. 6,982,846 and 7,193,803 are incorporated for their showing of data storage cartridges having rewritable media, but tamper resistant cartridge controlled write once recording thereof. Commonly assigned U.S. Pat. No. 6,339,810 is incorporated for treating rewritable data storage media as write once by automatically advancing a write append limiter and operating the data storage drive to prevent changes to the data occurring before the write append limiter. Commonly assigned application Ser. No. 11/697,004, U.S. Patent Application Publication 2008/0250197, provides formatting of virtual tape data objects with a virtual tape data object header.

BACKGROUND OF THE INVENTION

1. Field of the Invention

The invention relates to data storage with respect to data storage systems, and more particularly to a system for dynamic reuse of logical data objects.

2. Background Information

Traditionally, operating a write once read many (WORM) media relies on media type itself, so that a single physical data object cannot be both a standard read-write data object and a WORM enforced data object. These two media types are made mutually exclusive at manufacturing time. While it would be advantageous to have a common pool of physical media used for both WORM and read-write data object, it has not been physically possible based on the attributes bound to the media at manufacturing time. One WORM attribute required of WORM media is a 12 byte World Wide Identifier (WWID) that is unique per each media cartridge created. The WWID is used by software to tie written content on the media to a world unique instance of that media independent of any potential labeling changes of the data object. This allows software to detect anomalies or malicious behavior that may result in one data object being mistaken for another different physical media instance.

In the context of computer systems, the term "volume" is often used to describe a single accessible data storage area with a single file system that is resident on a media, such as a tape of a tape drive. As discussed herein, the terms "data object", "logical object", "logical data object", and "object" are used to refer to a volume, such as a tape volume or virtual tape volume. As is known in the art, the term volume is used interchangeably with "tape volume", "virtual tape volume", tape VOLSER (Volume Serial number), tape file volume, file volume, and file system.

A logical WORM environment has the same requirement for the WWID. The logical data objects may be inserted/created in a virtual library using an emulated media type. Software must know the independent media pools to direct appropriate input and/or output to the intended media pool. It would be advantageous if the virtual library could manage one common media pool and not need separate media pools for standard read-write and logical WORM data objects. Also, different logical WORM media data objects with the same data object serial number must be detectable. For physical tape media, each tape cartridge has the WWID generated and embedded into the cartridge at the time of manufacture independent of its data object serial number or VOLSER. Application software honoring WORM media may use the WWID in order to detect when the physical media has been replaced, thus detecting potential malicious behavior. In a virtual storage system, a physical media object may not be directly associated with a virtual object. Instead, the virtual object may be a simple file stored in a disk subsystem. The file then has meta-data associated with it that can be stored in a database independent of the file. The chain of custody patterns of the file may complicate things since the virtual object may be replicated and/or offloaded to multiple physical data objects. The overall lifecycle of the virtual object may introduce numerous events where its contents may be compromised.

For example, an independent server may write the same data object serial number that may be stacked to a physical cartridge. If that physical cartridge were to be relabeled and inserted falsely into the original server, its contents, including the stacked logical data object, may not be detected as different or having changed.

Occasionally, a data object is mistakenly returned to a common pool in a 'scratch' state. A data object, either WORM or read-write, in a scratch state indicates that any data on the data object as expired, or is invalid, and can be deleted, or overwritten, and the data object reused as a new data object. For WORM data, this represents a data loss condition that is particularly undesirable. If such a mistake occurs, a previously written WORM data object could be overwritten with non-WORM type data or different WORM data.

SUMMARY OF THE INVENTION

In one embodiment, a method for operating a virtual server supporting at least one Write Once Read Many (WORM) logical data object and at least one read-write logical object. The method comprises initializing a logical data object from a common pool of the logical data objects, the logical data object bound with a member of a media type group in response to a write command to beginning of logical data object to replace the any information previously associated with the logical data object. The member of the media type group comprises a WORM logical data object and a read-write logical data object. Reusing one of the logical data objects as the member of the media type group without ejection and reinsertion by mounting the logical data object with a write from beginning of logical data object to bind at least one data attribute to the member of the media type group to replace any previous attribute and data associated with the logical data object.

BRIEF DESCRIPTION OF THE DRAWINGS

FIGS. 3 to 5 are flowcharts of various operations of the virtual server;

DESCRIPTION OF THE PREFERRED EMBODIMENTS

Figure 1:
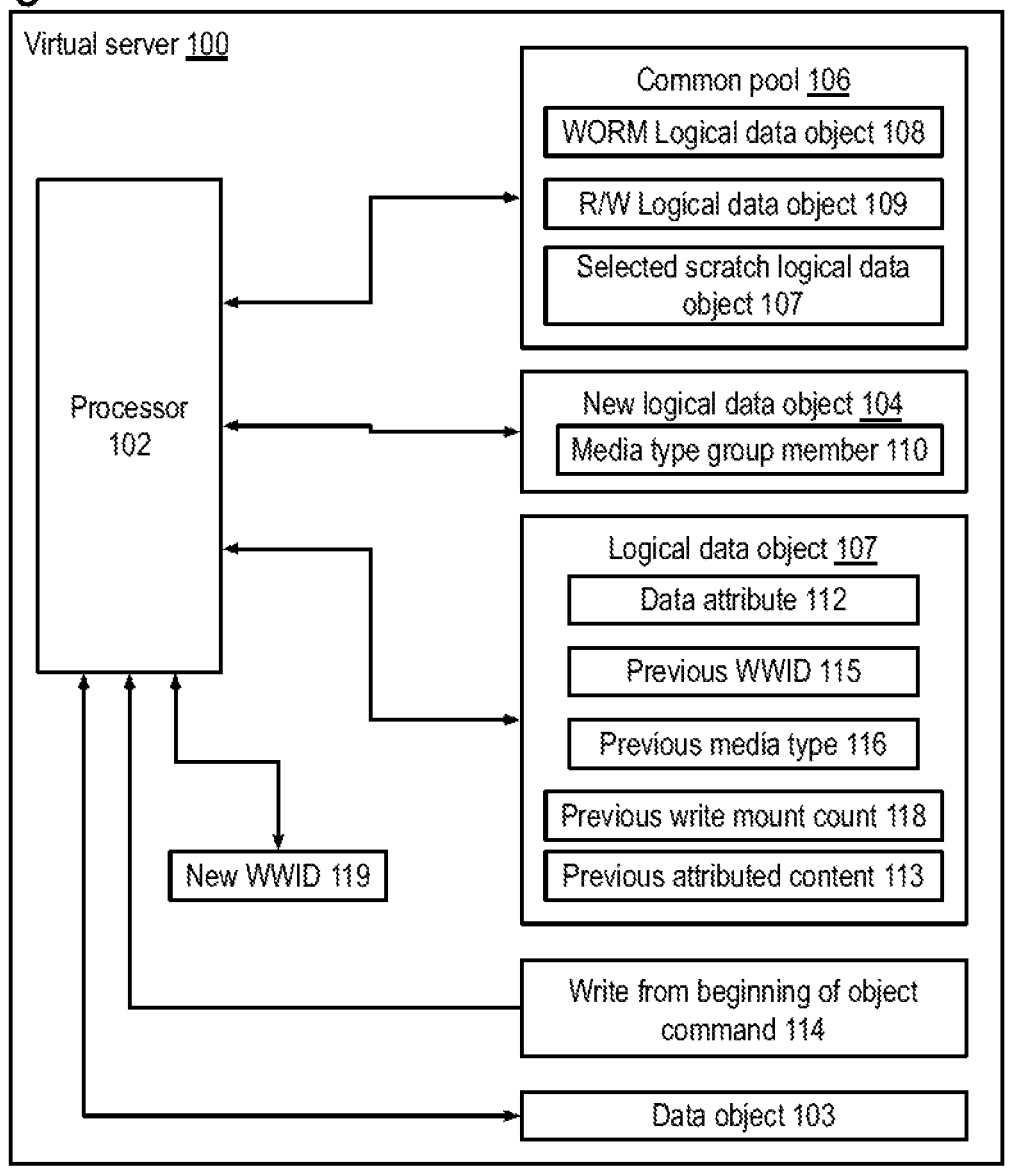
FIG. 1 is a diagrammatic illustration of a virtual server that may be embodied in the systems of FIGS. 7 to 8.

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

The foregoing problems are solved and an advance in the art is obtained by a novel system for dynamic reuse of logical data objects. The system includes a virtual tape server supporting at least one Write Once Read Many (WORM) logical data object and at least one read-write logical data object. In one embodiment, the virtual server comprises a processor configured to initialize a logical data object from a common pool of at least two logical data objects. The logical data object is bound with a member of a media type group in response to a write command to beginning of logical data object to replace any information previously associated with the logical data object. The media type group members comprise a WORM logical data object and a read-write logical data object. The processor is configured to reuse one of the logical data objects as the member of the media type group without ejection and reinsertion by mounting the logical data object with a write from beginning of logical data object to bind at least one data attribute to the member of the media type group to replace any previous attribute and data associated with the logical data object.

As a general, systematic overview, the virtual server may include a management interface where policy based construct definitions can be configured. As the virtual server, or an external host (not shown), mounts logical data objects, constructs are provided stating how the system should manage data of the logical data objects. Rules are defined, through indirection for example, via the management interface. The rules determine if the mounted logical data object should be treated as Write Once Read Many (WORM) or read-write.

If a selected logical data object is to be configured as WORM, a temporary data attribute, such as temporary World Wide Identifier (WWID), is generated and provided to the server during the mount. If the server accepts the selected logical data object, a first write command to beginning of logical data object will occur. At this time, the WWID is bound to the logical data object and retains its WORM attributes. If the logical data object was previously a WORM logical data object, its data and previous WWID is atomically overwritten at this time, which simulates an eject and re-insertion of different media with the same VOLSER (Volume Serial number). While the logical data object is mounted, the virtual server will move the logical data object out of a scratch pool and into a private pool to prevent circular reuse of the logical data object.

When a read-write or WORM logical data object is believed to no longer have valid content with respect to the host, all data stored on the logical data object has expired, the virtual server will move the logical data object from the private pool to a common scratch pool comprising both WORM and read-write logical data objects. This allows the logical data object to again be a candidate for future mounts and reuse. Future mounts can then re-bind the logical data object as either read-write or WORM.

It is valuable to retain the logical data object type (WORM or read-write) and data attributes, such as WWID, until first write, since it allows the virtual server processing the mount to reject the selected logical data object, thus leaving the logical data object's previous data and data attributes unmodified. For example, a logical data object may have inadvertently been moved into a scratch pool, then selected for a scratch mount. The virtual server determines that the selected logical data object was inadvertently moved into a scratch pool and the selected logical data object contains valid or unexpired data. The virtual server then fails the mount operation and the unexpired or valid data, along with the media type, either WORM or read-write, is maintained. Simultaneously, the virtual server moves the selected logical data object back into a protected private pool, which prevents any of the existing WORM protected data on the selected logical data object from being lost.

Additionally, the virtual server may inadvertently move a selected logical data object into a scratch pool and then move it back to a private pool before it is reused. This moving of a logical data object from a private pool to a scratch pool, and then back to the private pool does not cause any loss of the WORM protected data on the selected logical data object. Only when a reuse of a selected logical data object occurs, where a write command from beginning of logical data object is issued, will any existing data and data attributes associated with the selected logical data object overwritten and any previous data be truncated.

In summary, embodiments of the virtual server are configured to protect previous WORM objects even though they have been made available for reuse, such as by indicating that the data on the logical data object is invalid, and placing them in a state which allows reversal of the decision by the processor. With respect to WORM data objects, there are requirements that must be met to protect the data object against being modified or overwritten. There is no requirement to protect the previous WORM object from destruction. Whether the object is to be made a new WORM or whether it is to be made a read/write, the reuse is held until the host indicates it is ready to write at Beginning of Logical data object, referred to in the art as "Beginning of Tape" (BOT), which indicates that the host agrees with the reuse. At that point, all the data of the WORM, and associated information such as the previous WWID, are deleted, and the logical object is assigned a new WWID and bound as a WORM or is made a read/write object.

Referring to FIGS. 1 to 8, a virtual server 100 may include a processor 102, which may include a hierarchical storage node 60 and a virtualization node 40 (both shown in FIG. 8) that may be configured to operate in the virtual server 100, based upon the following description.

Figure 2:
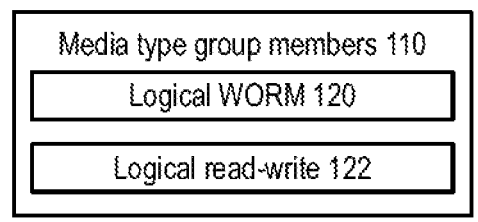
FIG. 2 is a diagrammatic illustration of media type group members.

In one embodiment, the virtual server 100 supports at least one Write Once Read Many (WORM) logical data objects 108 and at least one read-write logical data object 109 that reside in a common pool 106. A processor 102 is configured to initialize a new logical data object 104 from the common pool 106 of at least two logical data objects 108 and 109. The new logical data object 104 is bound with a media type group member 110 in response to a write command to beginning of the logical data object 114, i.e. a write beginning of tape (BOT) command, to replace any information previously associated with the logical data object 107. The information previously associated with the logical data object 107 may include a previous World Wide Identifier (WWID) 115, media type (such as WORM or read-write) 116, write mount count 118 and attributed content 113. The new logical data object is bound with a member of a media type group comprising a WORM data object 120 and a read-write data object 122 as shown in FIG. 2. The processor 102 is configured to reuse one of the logical data objects 107 as the media type group member 110 without ejection and reinsertion by mounting the logical data object with a write from beginning of the logical data object to bind at least one data attribute 112 to the media type group member 110 to replace any previous attribute 112, 115, 116, 118 and data 113 associated with the logical data object 107.

The processor 102 may further be configured to utilize a logical data object 107 from the common pool 106 as the new logical data object 104 with its previous data object serial number 114, a previous data object logical media type 116 and a previous write mount count 118. The processor 102 generates a new World Wide Identifier (WWID) 119 for the new logical data object 104 that is probabilitically non-repeatable. The processor 102 may be configured to bind the new WWID 119 and the media type group member 110 to a logical data object 107 to create the new logical data object 104, thereby replacing a previous WWID 115, a previous media type 116 and a previous write mount count 118 in response to a write from the beginning of the object 114. The previous write mount count 118 may be reset when the new WWID 119 and the media group type member 110 are bound to the logical data object 107 to create the new logical data object 104. The new WWID 119 is bound at first write from beginning of the object command 114 replaces any previous media type 116 while removing any previously associated data 113. Until the new WWID 119 and media type group member 110 have been bound to the new logical data object 107, the previous WWID 115, the previous media type 116, the previous write mount count 118 and any previous associated data 113 may still be retrieved from the logical data object 107.

The processor 102 may be configured to respond to mounting a data object 103 with an anticipated write from load point to use the data object as the logical data object 107 to create the new logical data object 104.

The processor 102 operates the virtual server 100 by responding to a mount of the data object 103 with an anticipated write from load point by using the data object 103 as the logical data object 107 to create the new logical data object 104. The processor 102 may be configured to reset the write mount count 118 when the new WWID 119 and the media type group member 110 are bound to the new logical data object 104. The processor 102 cycles the WORM logical data object 108 through the common pool 106 as a selected scratch logical data object 107 with the common pool comprising scratch logical data objects that may include a WORM logical data object 108 and a read-write logical data object 109. Reuse of the selected scratch logical data object 107 occurs only upon the processor cycling the selected scratch logical data object through the scratch pool 106.

In one embodiment, the invention includes an exemplary method for operating a virtual server 100 supporting at least one Write Once Read Many (WORM) logical data objects 108 and at least one read-write logical objects 109. The method includes the steps of initializing a new logical data object 104 from a common pool 106 of at least two logical data objects 108 and 109. The new logical data object 104 bound with the media type group member 110 in response to a write to beginning of the logical data object 114 to replace any information 112, 113, 115, 116 and 118 previously associated with the logical data object 107. One of the logical data objects 104 is reused as the media type group member 110, without ejection and reinsertion by mounting the logical data object 107 with a write from beginning of the logical data object 114 to bind at least one data attribute 112 to the media type group member 110 to replace any previous attribute 115, 116 and 118 and data 113 associated with the logical data object 107.

In another exemplary embodiment, the invention comprises a computer program product that comprises a computer usable medium having computer usable program code embodied therewith. The program code is configured to operate the processor 102 to operate the virtual server 100 to support at least one WORM logical data object 108 and at least one read-write logical data object 109, to initialize the new logical data object 104 from the common pool 106 of at least two logical data objects 108 and 109, the new logical data object 104 bound with the media type group member 110 in response to a write to beginning of the logical data object 114 to replace any information 113, 115, 116 and 118 previously associated with the logical data object 107. The logical data object is bound with the media type group 110 and to reuse one of the logical data objects 107 as the media type group member 110 without ejection and reinsertion by mounting the logical data object 107 with a write from beginning of the logical data object 114 to bind at least one data attribute 112 to the media type group member 110 to replace any previous attribute 112, 115, 116, 118 and data 113 associated with the logical data object 117.

FIGS. 3 to 5 show exemplary flowcharts of the operations of the processor 102 as steps that may be implemented as program instructions. Referring to FIG. 3, an exemplary flowchart of program instructions for operating the processor 102 to operate the virtual server 100 is shown. Step 130 operates the processor 102 to operate as the virtual server 100 supporting at least one WORM logical data object 108 and at least one read-write data object 109. Step 132 initializes the new logical data object 104 from the common pool 106 with the new logical data object bound with the medium type group member 110. Step 134 reuses one of the logical data objects 104 as the media type group member 110. Step 136 mounts the logical data object 104 with a write from beginning of object command 114 to bind the at least one data attribute 112 to the media type group member 110.

FIG. 4 shows a flowchart refining the example of program instructions 130 and in particular 132 of FIG. 3 for operating the processor 102 to operate the virtual server 100 as follows: Step 138 utilizes a logical data object 107 from the common pool 106 as the new logical data object 104 with its previous data object WWID 115, a previous data object logical media type 116 and a previous write mount count 118. Step 140 generates a new World Wide Identifier (WWID) 119 for the new logical data object 104 that is probabilistically non-repeatable. Step 142 binds the new WWID 119 and the media type group member 110 to the logical data object 107 to create the new logical data object 104, thereby replacing the previous WWID 115, the previous media type 116 and the previous write mount count 118.

FIG. 5 shows a flowchart refining the example of program instructions 130 and in particular 134 of FIG. 3 for operating the processor 102 to operate the virtual server 100 as follows: Step 150 responds to a mount of the data object 103 with an anticipated write from load point by using the data object as the logical data object 107 to create the new logical data object 104. Step 152 resets the write mount count 118 when the new WWID 119 and the media type group member 110 are bound to the new logical data object 104. Step 154 cycling the WORM logical data object 108 through the common pool 106 as a selected scratch logical data object 107 with the common pool comprising scratch logical data objects that may be a WORM logical data object 108 or a read-write logical data object 109. Reuse of the selected scratch logical data object 107 occurs only upon the processor cycling the selected scratch logical data object through the scratch pool 106.

Figure 9:
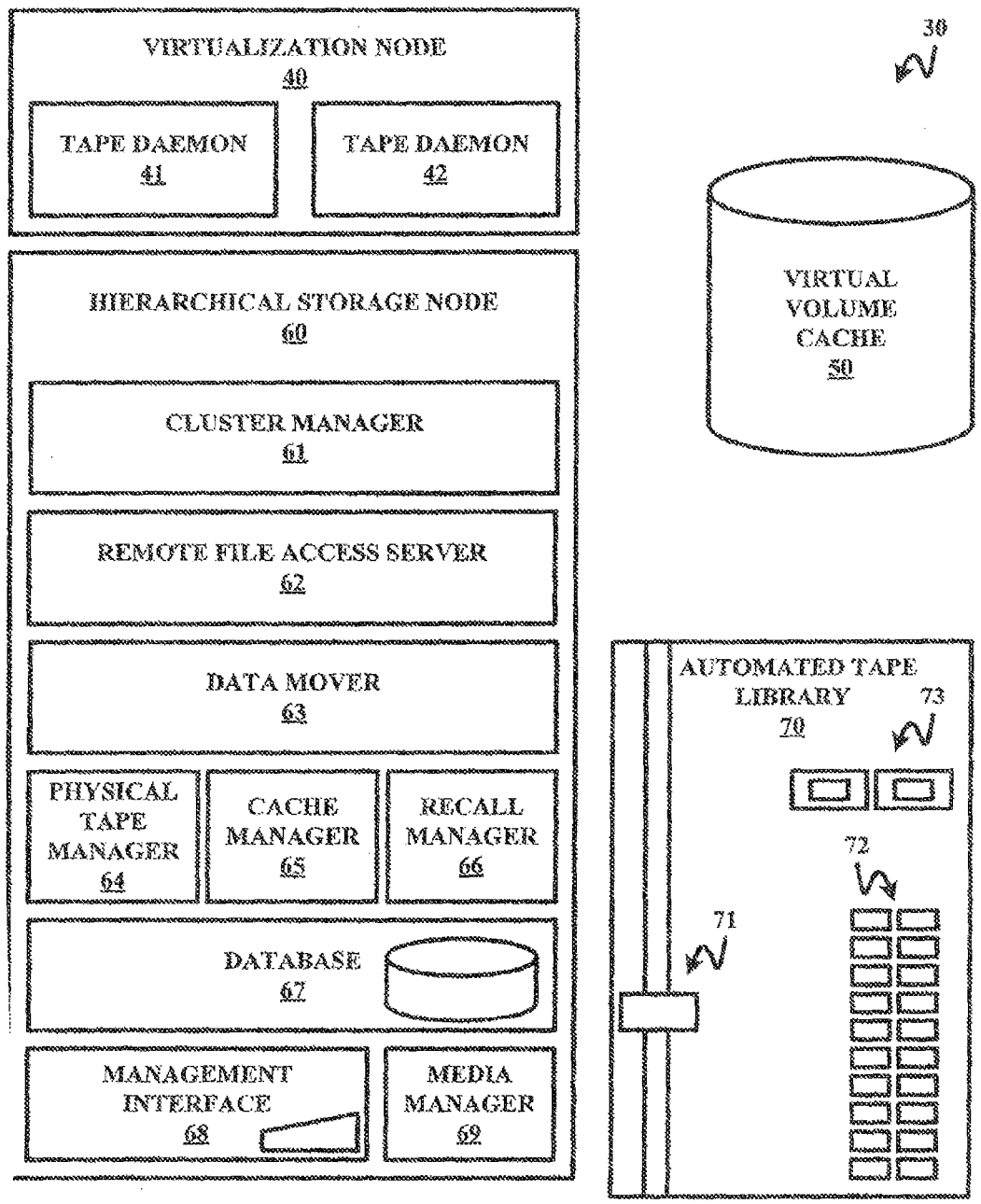
FIG. 9 is a diagrammatic illustration of a server of the data storage system of FIG. 8.

The implementations may involve software, firmware, micro-code, hardware and any combination thereof. Referring to FIG. 9, the implementation may take the form of code or logic implemented in a medium, such as memory, storage and circuitry of hierarchical storage node 60, where the medium may comprise hardware logic (e.g. an integrated circuit chip, Programmable Gate Array [PGA], Application Specific Integrated Circuit [ASIC], or other circuit, logic or device), or a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a rigid magnetic disk and an optical disk, compact disk-read only memory [CD-ROM], compact disk-read/write [CD-R/W] and DVD).

Figure 6:
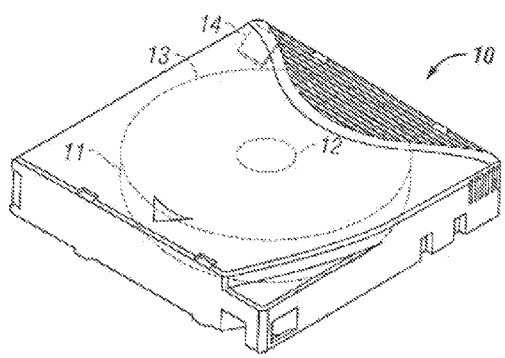
FIG. 6 is an isometric view of a removable data storage cartridge with a media, such as magnetic tape, and with a cartridge memory shown in phantom.

Referring to FIG. 6, an example of a data storage cartridge 10, such as a magnetic tape cartridge, is illustrated which comprises a rewritable magnetic tape 11 wound on a hub 12 of reel 13, and a cartridge memory 14. One example of a magnetic tape cartridge comprises a cartridge based on LTO (Linear Tape Open) technology. The cartridge memory (CM) 14, for example, comprises a transponder having a contactless interface, which is retained in the cartridge 10, for example, by being encapsulated by the cartridge when it is assembled, as is understood by those of skill in the art. The illustrated magnetic tape cartridge is a single reel cartridge. Magnetic tape cartridges may also comprise dual reel cartridges in which the tape is fed between reels of the cartridge. The magnetic tape 11 is typically arranged to store a large number of data objects of data.

One requirement of WORM media is that different instances of media with the same data object serial number must be detectable to protect the integrity of the data against possible malicious behavior. Where the WORM media or media treated as though it were WORM is in a physical media object, a world wide name embedded in the media cartridge 10 may be employed to detect when the physical media has been replaced, thus detecting potential malicious behavior.

Data is not always stored on a physical media 11 whose replacement in a physical cartridge 10 can be detected. Rather, data storage systems may store data in different forms, such as logical or virtual data, and an example of such a system is illustrated in the data storage system 20 of FIG. 8. Herein, data may be organized in any of various forms, called "data objects" or "objects", the terms chosen without reference to any particular size or arrangement of data.

Figure 8:
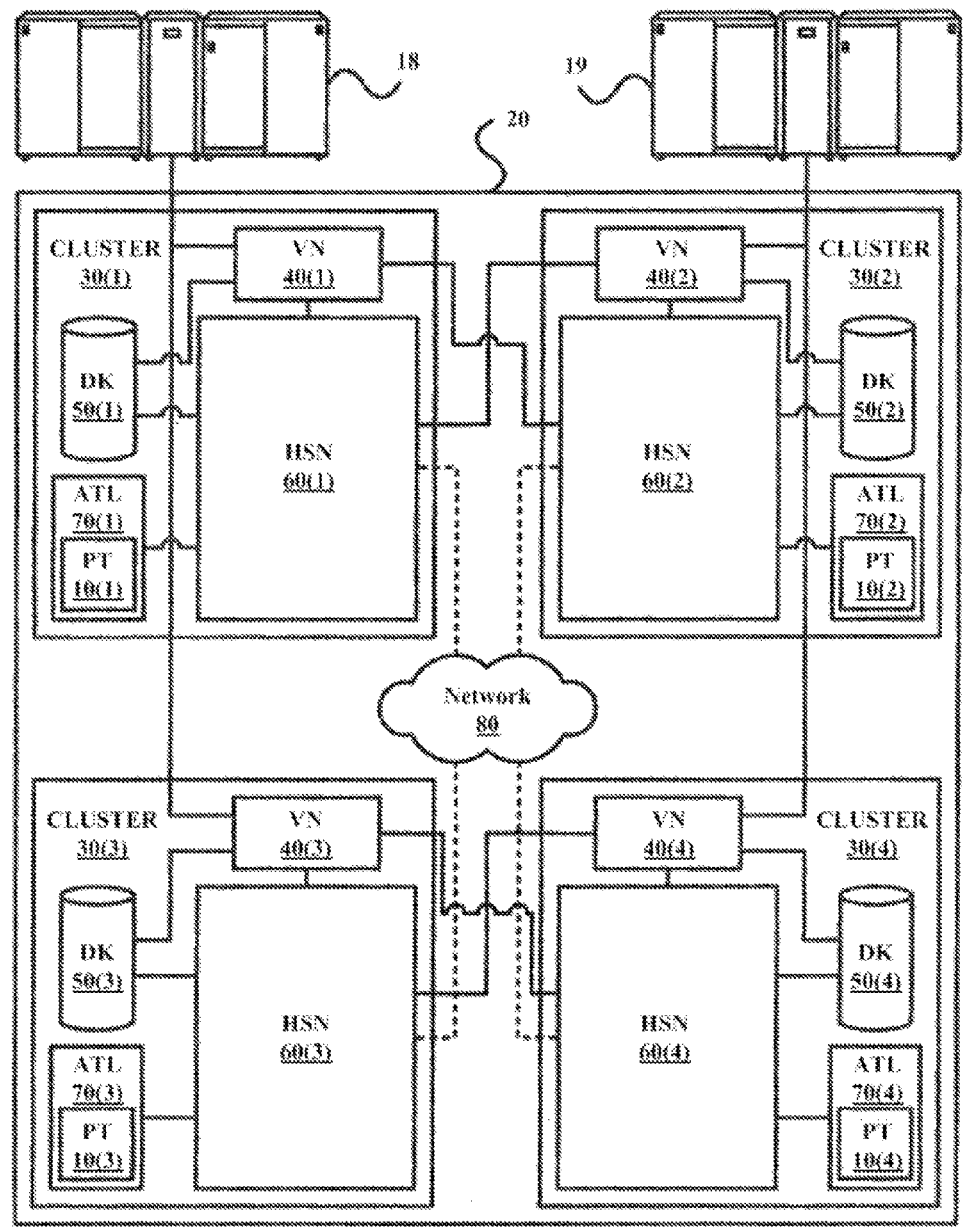
FIG. 8 is a diagrammatic illustration of a data storage system which may implement the invention.

Referring to FIGS. 8 and 9, the data storage system 20 provides storage for a plurality of host systems 18, 19. The data storage system 20, in one embodiment, employs four (4) virtual tape server clusters 30 interconnected by a network 80 with each cluster 30 including a virtualization node ("VN") 40 and a disk storage ("DK") 50 for emulating a tape drive or tape library to hosts 18, 19. Each cluster further comprises a hierarchical storage node ("HSN") 60 for locally moving data between disk storage 50 and an automated tape library ("ATL") 70 as well as remotely moving data between a local disk storage 50 and a remote disk storage. Examples of disk storage comprise one or more disk drives, for example, arranged as a redundant array of independent disks (RAID) or just a bunch of disks (JBOD), or solid state disk (SSD), etc. Herein, a data storage system having both disk storage 50 and an automated tape library 70 is called a "composite library".

The disk storage 50 may serve as a virtual data object cache containing logical data objects that emulate data objects that may be stored on the magnetic tape 11 of FIG. 6. Still referring to FIGS. 8 and 9, the logical data objects may stored by disk storage 50 for local and remote access thereto, and library 70 comprises at least one robotic accessor 72 for mounting physical tape cartridges 10 in physical tape drives 73 for access to data objects stored in the physical tape cartridges 10. To this end, virtualization node 40 may employ a pair of tape daemons 41 and 42 for operating on virtual data object files residing in either local cache disk storage 50 or a remote cache disk storage as directed by a host system 18, 19, and a hierarchical storage node 60 may employ a cluster manager 61, a remote file access server 62, a data mover 63, a physical tape manager 64, a cache manager 65, a recall manager 66, a database 67, a management interface 68 and a media manager 69.

Cluster manager 61 may coordinate operations between clusters 30 via intercluster tokens that are stored in each cluster's database 67 to determine which cluster 30 has a current copy of data and coordinates copying of data between clusters. Remote file access server 62 may provide a link to cache disk storage 50 by a remote cluster. Data mover 63 may control the actual data transfer operations for copies performed between clusters 30 and transfers of data between cache disk storage 50 and library 70.

Physical tape manager 64 may manage physical tape data objects in library 70 in multiple physical data object pools, controls reclamation, borrows/returns data objects from a scratch pool, and controls movement of physical tape cartridges 10 and the data objects between pools. Cache manager 65 may control a copying of data objects between cache disk storage 50 to library 70 and any subsequent removal of a redundant copy of data in cache 50, and may provide control signals to balance data flow between cache disk storage 50 and other node 60 components. Recall manager 66 may queue and control recalls of data into cache data storage 50 from library 70 on behalf of virtualization node 40 and cluster manager 61.

Management interface 68 may provide information about virtual tape server cluster 30 and may allow a user control and configuration of cluster 30. Media manager 69 may manage the handling of physical tape cartridges 10 and error recovery, and diagnoses errors and determines if the errors were caused by a physical tape drive 73 of library 70 or a physical tape media 11 to thereby take appropriate action.

An example of a data storage system 20 that may implement the present invention is discussed in the incorporated '004 Application, and another example includes the IBM® TS7700 Virtual Tape Server.

Figure 7:
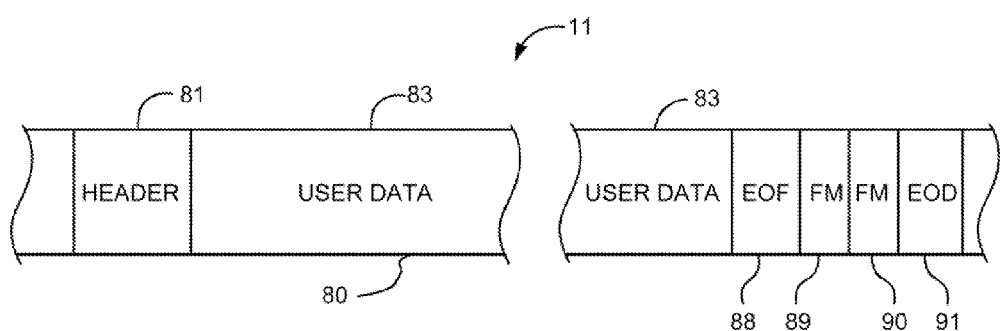
FIG. 7 is a diagrammatic illustration of information of a logical data object.

Referring to FIG. 7, a logical data object or data object 80 comprises data arranged to emulate a data object or data object physically recorded on a magnetic tape 11. A magnetic tape 11 may be organized in many ways. Typically, a magnetic tape is arranged with parallel tracks, and may also be arranged with several parallel wraps of groups of parallel tracks. In one example, the magnetic tape is moved longitudinally in a first direction while a tape head system reads and writes data with respect to one wrap, and is reversed to be moved in the opposite direction and the tape head system is shifted to another wrap. A disk drive, in contrast, typically comprises data that is recorded in a serial fashion and is read and written by a single head on the surface of a rotating disk. Thus, the data of a disk drive is typically rearranged to a format that matches that of a magnetic tape, and adds information related to the magnetic tape, in order to emulate the data of the magnetic tape.

Typical constructs include a header 81 at the beginning of the data object or object, followed by user data 83. A trailer 88, such as at the end of the data object or object, may indicate the end of a file within the data object or object and, for example, comprises a filemark 89, and the end of the data object or object may comprise a number of additional filemarks 90 and an end of data marker 91.

Operations involving access to logical data objects that are emulating magnetic tape require that the data first be "mounted", to emulate loading and mounting of a magnetic tape in a magnetic tape drive, called herein a logical mount.

In the field of cryptography, a cryptography checksum hash is difficult to reproduce when it derives from a modified payload of data. If a payload is maliciously modified, it will be near impossible for the resulting checksum hash that is regenerated to match the originally generated checksum hash. The goal of the present invention is to produce a checksum value that is just as unlikely to be reproduced. However, the payload is not being protected, but, by using nonce fields, the payload is being manipulated to produce a value that is highly unlikely to ever be reproduced. For example, the use of a field that is never likely to occur a 2nd time in the payload, such as the timestamp, makes the resulting checksum hash even more unlikely to be produced a second time. Such a resulting checksum can be used as a unique WORM identifier. With appropriate nonce fields, a checksum can result in a 12 byte World Wide Identifier (WWID) that is unique for an instance of a WORM logical data object as previously described.

Once the unique WORM identifier is generated and bound to the data object, no algorithm is likely to exist that can identically create the same identifier for the given data object or data object. The unique WORM identifier is one that is probabilistically insignificantly unlikely to be regenerated for the some VOLSER within the same server or library, or any server or library in the world. There is an assumption that if a malicious person was capable of modifying the fields which are used for the payload, then that person has already breached numerous secure interfaces, including direct access to the raw data the checksum hash is attempting to protect in the first place. Therefore, the robustness of the algorithm mainly focuses on unexpected checksum hash collisions in order to leverage or detect flaws in the algorithm itself.

Additional protection comprises maintaining a write-mount count with respect to the logical data object in the header 81, for example as a token, and maintaining the write-mount count in the persistent database 67. The control 60, in order to allow the logical data object 80 to be accessed externally to the control, additionally requires the write-mount count of the header to be either equal to or greater by a value of one than the write-mount count of the persistent database.

In one example, the control 60 is configured to increment the write-mount count each time the logical data object is logically mounted and data is correctly appended to the logical data object. Attempts at incorrect appending of the WORM data will likely cause WORM handling errors to occur. An example of a method to append data to existing WORM data is discussed in the incorporated '810 patent.

Further, where the logical object is characterized by the control as a magnetic tape object, emulating a magnetic tape data object or object, the write-mount and the external access each comprises a logical mount of a logical magnetic tape cartridge, as discussed above.

The reason for having the write-mount count of the header to be either equal to or greater by a value of one than the write-mount count of the persistent database, is to account for any append failure where the device/server/system experiences a failure after the write-mount count is updated for the database 67, but before the header 81 is updated.

Upon a logical mount, if all 12 bytes of the database unique WORM identifier token and the header are not identical, the mount operation for the logical data object is failed, for example, with a mount completion error code. Even if the unique WORM identifier token of the database and the header match, but the write-mount count of the header is not either equal to or greater by a value of one than the write-mount count of the persistent database, the mount operation will also fail with an error code. An override may be provided to account for an unexpected and non-malicious situation, such as during a data restoration procedure.

The database 67 is maintained to be persistent by preventing unintentional overwrite of at least the portion of the database containing the unique WORM identifiers and write-mount counts associated with the logical identifiers of the integrity protected logical data objects.

In order to provide integrity of the WORM data for the data storage system 20 or composite library, the unique WORM identifiers and write-mount counts are synchronized between each of databases 67 for each of the clusters 30, for example, via network 80. Thus, if a WORM logical data object is transferred from one disk storage 50 or library 70 in one cluster, to a disk storage 50 or library 70 in another cluster, either via the network 80 or by transfer of a physical tape 10, the database 67 for that cluster will also provide data integrity with respect to the WORM logical data object, thereby providing data integrity for the entire storage system 20.

As discussed above, the overall lifecycle of a logical data object 80, both as stored in a server and on a physical media, may introduce non-protected places where its contents can be compromised. For example, another independent server may write data with the same data object serial number that can get stacked to a different physical tape cartridge. If that physical cartridge were to be relabeled and inserted falsely into the original server, its contents, including the stacked logical data object, may go undetected as different. Further, it may be possible that microcode issues may introduce race or data anomalies where logical data objects may be replaced with stale versions.

Referring to FIGS. 8, 9 and 7, a control, such as hierarchical storage node 60, is configured to protect the integrity of data, such as a WORM logical data object, against possible malicious behavior by assigning an unique WORM identifier to a logical data object, and to store the unique WORM identifier as associated with the logical identifier, in a database, such as database 67, maintained by the control so as to be persistent. Data storage, such as virtualization node 40, disk data storage 50, or library 70, is configured to write the logical data object 80, identified by the logical identifier, together with a header 81 with the unique WORM identifier. The control 60, in order to allow the logical data object to be accessed externally to the control, requires matching the unique WORM identifier in the header 81 of a logical data object 80 to the unique WORM identifier of the persistent database 67 for the logical object.

The database 67 may comprise the metadata with respect to the logical data object, and the unique WORM identifier for a logical data object is stored with the metadata for the logical data object. In one example, the logical identifier of the logical data object is a data object serial number or "VOLSER". In one example, the unique WORM identifier is the same length as a WWN (World Wide Name), for example, of 12 bytes.

In order to be "unique", the unique WORM identifier WWN is generated so as to be probabilistically unlikely to be generated twice for the same VOLSER. In one embodiment, the unique WORM identifier is formed of a checksum hash value related to nonce (numbers used once) fields comprising at least the logical identifier (VOLSER) of the logical data object, an incrementing token, and a time stamp. The checksum hash value may, for example, comprise a cryptography checksum hash of greater than 12 bytes, of which the least significant bits are truncated to leave the leftmost significant bits. A specific example comprises a "Message-Digest 5 (MD5)" cryptography checksum 128 bit hash, which is truncated to 96 bits.

Once the unique WORM identifier is generated and bound to the data object, no algorithm is likely to exist that can identically create the same identifier for the given data object or data object. The unique WORM identifier is one that is probabilistically insignificantly unlikely to be regenerated for the some VOLSER within the same server or library, or any server or library in the world. There is an assumption that if a malicious person was capable of modifying the fields which are used for the payload, then that person has already breached numerous secure interfaces, including direct access to the raw data the checksum hash is attempting to protect in the first place. Therefore, the robustness of the algorithm mainly focuses on unexpected checksum hash collisions in order to leverage or detect flaws in the algorithm itself.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for operating a virtual server, the method comprising:
   initializing a logical data object from a common pool of at least two logical data objects, said logical data object bound with a member of a media type group in response to a write command to beginning of logical data object to replace said any information previously associated with said logical data object, said media type group members comprising a Write Once Read Many (WORM) logical data object and a read-write logical data object; and
   reusing one of said at least two logical data objects as said member of said media type group without ejection and reinsertion by mounting said one of said at least two logical data objects with a write command to beginning of logical data object to bind at least one data attribute to said member of said media type group to replace any previous attribute and data associated with said one of said at least two logical data objects.

2. The method of claim 1, further comprising:
   selecting a logical data object from said common pool;
   determining when said selected logical data object is a WORM logical data object;
   determining when said selected WORM logical data object is available for reuse as a new WORM logical data object;
   maintaining data attributes bound to said selected WORM logical data object until it is determined that said selected WORM logical data object is available for reuse;
   assigning at least one temporary data attribute to said selected WORM logical data object while maintaining said data attributes bound to said selected WORM logical data object;
   mounting said selected WORM logical data object and receiving said write command to beginning of logical data object to bind at least one data attribute to said selected WORM logical data object to replace data attributes and data associated with said selected WORM logical data object to reuse said selected WORM logical data object as said new WORM logical data object.

3. The method of claim 2, further comprising:
   when it is determined that said selected logical data object is a WORM logical data object
   for reuse as a new read-write logical data object:
      maintaining data attributes bound to said selected WORM logical data object until it is determined that said selected WORM logical data object is available for reuse;
      assigning at least one temporary data attribute to said selected WORM logical data object while maintaining said data attributes bound to said selected WORM logical data object;
      mounting said selected WORM logical data object and receiving said write command to beginning of logical data object to remove data attributes and data associated with said selected WORM logical data object to reuse said selected WORM logical data object as said new read-write logical data object;
      generating a unique WORM identifier that is probabilistically insignificantly likely to be regenerated; and
      binding said unique WORM identifier to said selected WORM logical data object.

4. The method of claim 2, further comprising:
   when it is determined that said selected logical data object is a read-write logical data object
   for reuse as a new WORM logical data object:
      maintaining data associated with said selected read-write logical data object until it is determined that said selected read-write logical data object is available for reuse;
      assigning at least one temporary data attribute to said selected read-write logical data object while maintaining said data associated with said selected read-write logical data object; and
      mounting said selected read-write logical data object and receiving said write command to beginning of logical data object to bind at least one data attribute to said selected read-write logical data object to replace data associated with said selected read-write logical data object to reuse said selected read-write logical data object as said new WORM logical data object.

5. The method of claim 2, further comprising:
   providing said at least one temporary data attribute assigned to said selected WORM logical data object during said mounting of said selected WORM logical data object;
   determining when said selected WORM logical data object is available for reuse as said new WORM logical data object by issuing said write command to beginning of logical data object; and
   when said write command to beginning of logical data object is not performed, retaining said data associated with said selected WORM logical data object and said data attributes bound to said WORM logical data object and discarding said temporary data attributes.

6. The method of claim 1, wherein said common pool comprises scratch logical data objects, said scratch logical data objects comprising at least one WORM logical data object and at least one read-write logical data object.

7. The method of claim 6, wherein reuse of said logical data object is allowed only when said logical data object is selected from a scratch pool of said scratch logical data objects or when said logical data object is a logical data object that is newly inserted in the virtual server.

8. The method of claim 7, wherein reuse of said scratch logical data object occurs only in response to said scratch logical data object being cycled through said scratch pool as a selected scratch logical data object.

9. The method of claim 7, wherein said scratch logical data object is moved to said scratch pool only when it is determined that the data stored thereon has expired and said scratch logical data object is available for reuse.

10. A virtual server comprising:
a processor configured to initialize a logical data object from a common pool of at least two logical data objects, said logical data object hound with a member of a media type group in response to a write command to beginning of logical data object to replace any information previously associated with said logical data object, said media type group members comprising a Write Once Read Many (WORM) logical data object and a read-write logical data object; and
said processor configured to reuse one of said at least two logical data objects as said member of said media type group without ejection and reinsertion by mounting said one of said at least two logical data objects with a write command to beginning of logical data object to bind at least one data attribute to said member of said media type group to replace any previous attribute and data associated with said one of said at least two logical data objects.

11. The virtual server of claim 10, further comprising:
said processor configured to select said WORM logical data object from said at least two logical data objects for reuse as a new WORM logical data object, said processor maintaining data attributes bound to said selected WORM logical data object until it is determined that said selected WORM logical data object is available fix reuse;
said processor configured to assign at least one temporary data attribute to said selected WORM logical data object while maintaining said data attributes hound to said selected WORM logical data object; and
said processor configured to mount said selected WORM logical data object and receiving said write command to beginning of logical data object to bind at least one data attribute to said selected WORM logical data object to replace data attributes and data associated with said selected WORM logical data object to reuse said selected WORM logical data object as said new WORM logical data object.

12. The virtual server of claim 11, further comprising:
logic configured to provide said at least one temporary data attribute assigned to said selected WORM logical data object to said processor during said mounting of said selected WORM logical data object; and
said processor configured to determine when said selected WORM logical data object is available for reuse as said new WORM logical data object by issuing said write command to beginning of logical data object; and
when said write command to beginning of logical data object is not performed, said data associated with said selected WORM logical data object and said data attributes bound to said WORM logical data object are retained arid said temporary data attributes are discarded.

13. The virtual server of claim 10, further comprising:
said processor configured to select said WORM logical data object from said at least two logical data objects for reuse as a new read-write logical data object, said processor maintaining data attributes bound to said selected WORM logical data object until it is determined that said selected WORM logical data object is available for reuse;
said processor configured to assign at least one temporary data attribute to said selected WORM logical data object while maintaining said data attributes hound to said selected WORM logical data object;
said processor configured to mount said selected WORM logical data object and receiving said write command to beginning of logical data object to remove data attributes and data associated with said selected WORM logical data object to reuse said selected WORM logical data object as said new read-write logical data object;
said processor configured to generate a unique WORM identifier that is probabilistically insignificantly likely to he regenerated; and
said processor configured to bound said unique WORM identifier to said selected WORM logical data object.

14. The virtual server of Claim 10, further comprising:
said processor configured to select said read-write logical data object from said at least two logical data objects for reuse as a new WORM logical data object, said processor maintaining data associated with said selected read-write logical data object until it is determined that said selected read-write logical data object is available for reuse;
said processor configured to assign at least one temporary data attribute to said selected read-write logical data object while maintaining said data associated with said selected read-write logical data object; and
said processor configured to mount said selected read-write logical data object and receiving said write command to beginning of logical data object to bind at least one data attribute to said selected read-write logical data object to replace data associated with said selected read-write logical data object to reuse said selected read-write logical data object as said new WORM logical data object.

15. The virtual server of claim 10, wherein said common pool comprises scratch logical data objects, said scratch logical data objects comprising at least one WORM logical data object and at least one read-write logical data object.

16. The virtual server of claim 15, wherein reuse of said logical data object is allowed only when said logical data object is selected from a scratch pool of said scratch logical data objects or when said logical data object is a logical data object that is newly inserted in the virtual server.

17. The virtual server of claim 16, wherein reuse one of said scratch logical data object occurs only in response to said processor cycling said scratch logical data object through said scratch pool as a selected scratch logical data object.

18. The virtual server of claim 16, wherein said scratch logical data object is moved to said scratch pool only when said processor has determined that the data stored thereon has expired and said scratch logical data object is available for reuse.

19. The virtual server of claim 15, wherein said processor is configured to cycle said WORM logical data object through said scratch pool as a selected scratch logical data object.

20. The virtual server of claim 10, further comprising a memory configured for storing instructions operable with said processor, said instructions comprising:
operating said processor to allow said virtual server to operate with at least one WORM logical data object and at least one read-write logical data object;
initializing said logical data object from said common pool of said at least two logical data objects, with said logical data object bound with said member of said media type group in response to said write command to beginning of logical data object; and
reusing one of said at least two logical data objects as said member of said media type group without ejection and reinsertion by mounting said one of said at least two logical data objects with said write command to beginning of logical data object to bind at least one data attribute to said member of said media type group to replace any previous attribute and data associated with said one of said at least two logical data objects.

21. A computer program product comprising:
a non-transitory computer readable storage medium having computer usable program code embodied therewith, the computer usable program code comprising:
computer usable program code configured to operate a processor to operate a virtual server configured to support at least one Write Once Read Many (WORM) logical data object and at least one read-write logical data object;
computer usable program code configured to initialize a logical data object from a common pool of at least two logical data objects, said logical data object bound with a member of a media type group in response to a write command to beginning of logical data object to replace any information previously associated with said logical data object, said media type group comprising a WORM data object and a read-write data object; and
computer usable program code configured to reuse one of said at least two logical data objects as said member of said media type group without ejection and reinsertion by mounting said one of said at least two logical data objects with a write command to beginning of logical data object to bind at least one data attribute to said member of said media type group to replace any previous attribute arid data associated with said one of said at least two logical data objects.

22. The computer program product of claim 21, wherein said common pool comprises scratch logical data objects, said scratch logical data objects comprising at least one WORM logical data object and at least one read-write logical data object.

23. The computer program product of Claim 22, wherein said computer usable program code configured to initialize further comprises:
computer usable program code configured to operate said processor to select said WORM logical data object from said at least two logical data objects for reuse as a new WORM logical data object, said processor maintaining data attributes bound to said selected WORM logical data object until it is determined that said selected WORM logical data object is available for reuse;
computer usable program code configured to operate said processor to assign at least one temporary data attribute to said selected WORM logical data object while maintaining said data attributes bound to said selected WORM logical data object; and
computer usable program code configured to operate said processor to mount said selected WORM logical data object and receive said write command to beginning of logical data object to bind at least one data attribute to said selected WORM logical data object to replace data attributes and data associated with said selected WORM logical data object to reuse said selected WORM logical data object as said new WORM logical data object.

24. The computer program product of claim 23, further comprising:
computer usable program code configured to provide said at least one temporary data attribute assigned to said selected WORM logical data object to said processor during said mounting of said selected WORM logical data object; and
computer usable program code to operate said processor to determine if said selected WORM logical data object is available for reuse as said new WORM logical data object by issuing said write command to beginning of logical data object.

25. The computer program product of claim 21, further comprising:
computer usable program code configured to operate said processor to select said WORM logical data object from said at least two logical data objects for reuse as a new read-write logical data object, said processor maintaining data attributes bound to said selected WORM logical data object until it is determined that said selected WORM logical data object is available for reuse;
computer usable program code configured to operate said processor to assign at least one temporary data attribute to said selected WORM logical data object while maintaining said data attributes bound to said selected WORM logical data object;
computer usable program code configured to operate said processor to mount said selected WORM logical data object and receive said write command to beginning of logical data object to remove data attributes and data associated with said selected WORM logical data object to reuse said selected WORM logical data object as said new read-write logical data object;
computer usable program code configured to generate a unique WORM identifier that is probabilistically insignificantly likely to be regenerated; and
computer usable program code configured to bound said unique WORM identifier to said selected WORM logical data object.

26. The computer program product of claim 21, further comprising:
computer usable program code configured to operate said processor to select said read-write logical data object from said at least two logical data objects for reuse as a new WORM logical data object, said processor maintaining data associated with said selected read-write logical data object until it is determined that said selected read-write logical data object is available for reuse;
computer usable program code configured to operate said processor to assign at least one temporary data attribute to said selected read-write logical data object while maintaining said data associated with said selected read-write logical data object; and
computer usable program code configured to operate said processor to mount said selected read-write logical data object and receiving said write command to beginning of logical data object to bind at least one data attribute to said selected read-write logical data object to replace data associated with said selected read-write logical data object to reuse said selected read-write logical data object as said new WORM logical data object.

* * * * *